(12) United States Patent
Wake et al.

(10) Patent No.: US 9,067,506 B2
(45) Date of Patent: Jun. 30, 2015

(54) VEHICLE AND METHOD OF CONTROLLING VEHICLE

(71) Applicant: HONDA MOTOR CO., LTD., Tokyo (JP)

(72) Inventors: Chihiro Wake, Wako (JP); Koichi Takaku, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 39 days.

(21) Appl. No.: 13/917,643

(22) Filed: Jun. 14, 2013

(65) Prior Publication Data

US 2014/0012444 A1 Jan. 9, 2014

(30) Foreign Application Priority Data

Jul. 3, 2012 (JP) ................................. 2012-149837

(51) Int. Cl.
*B60L 11/18* (2006.01)

(52) U.S. Cl.
CPC ............. *B60L 11/1881* (2013.01); *Y02E 60/50* (2013.01); *Y02T 90/16* (2013.01); *Y02T 10/7005* (2013.01)

(58) Field of Classification Search
CPC .................................................. B60L 11/1881
USPC ........ 701/22; 141/231; 296/97.22; 340/426.1
See application file for complete search history.

(56) References Cited

U.S. PATENT DOCUMENTS

| 6,021,823 A * | 2/2000 | Hale ............................. 141/231 |
| 6,510,642 B2 * | 1/2003 | Riener ......................... 42/70.11 |
| 7,806,456 B1 * | 10/2010 | Zandparsa ................. 296/97.22 |
| 2004/0164850 A1 * | 8/2004 | Konno et al. ............... 340/426.1 |
| 2007/0006328 A1 * | 1/2007 | Sogo ............................... 726/34 |
| 2010/0077807 A1 * | 4/2010 | Takeuchi et al. ................ 70/158 |
| 2012/0202094 A1 * | 8/2012 | Sada ................................. 429/9 |
| 2013/0282500 A1 * | 10/2013 | Latorre ........................... 705/17 |
| 2014/0012444 A1 * | 1/2014 | Wake et al. ...................... 701/22 |

FOREIGN PATENT DOCUMENTS

JP 2001-351667 12/2001

* cited by examiner

*Primary Examiner* — Thomas G Black
*Assistant Examiner* — Wae Louie
(74) *Attorney, Agent, or Firm* — Mori & Ward, LLP

(57) ABSTRACT

A vehicle includes an energy storage, a connecting portion, a lid box, a lid state detector, a vehicle speed detector, and a stop drive device. An external energy supply device is connected to the connecting portion when energy is supplied to the energy storage from the energy supply device. The lid box is to protect the connecting portion. The lid box includes a lid. The lid state detector is configured to detect an open state of the lid of the lid box. The vehicle speed detector is configured to detect a speed of the vehicle. The stop drive device is configured to prevent the vehicle from being driven if the open state of the lid is detected and if the speed of the vehicle is lower than or equal to a threshold stopped vehicle speed.

11 Claims, 3 Drawing Sheets

VEHICLE AND METHOD OF CONTROLLING VEHICLE

CROSS-REFERENCE TO RELATED APPLICATIONS

The present application claims priority under 35 U.S.C. §119 to Japanese Patent Application No. 2012-149837, filed Jul. 3, 2012, entitled "Vehicle." The contents of this application are incorporated herein by reference in their entirety.

BACKGROUND OF THE INVENTION

1. Field of the Invention

The present disclosure relates to a vehicle and a method of controlling the vehicle.

2. Discussion of the Background

A fuel cell vehicle runs by supplying oxygen containing air and hydrogen to fuel cells and driving an electric motor using electric power generated by the fuel cells. In recent years, commercial application of a fuel cell vehicle has been advanced which uses those fuel cells as energy source for generating power. Hydrogen is needed for a fuel cell to generate electric power, and the mainstream fuel cell vehicles in recent years run using hydrogen in a hydrogen tank which is provided with a high pressure tank or a storage alloy and which previously stores a sufficient amount of hydrogen.

When a hydrogen tank of a fuel cell vehicle is filled with hydrogen gas at a hydrogen station, a driver connects a hydrogen filling nozzle of a dispenser at the hydrogen station to a hydrogen introducing port provided in the vehicle. The hydrogen introducing port is disposed so as to be protected in a lid box on a lateral side of the vehicle in order to prevent damage caused by foreign substances which may be introduced during driving the vehicle. The driver can open a lid of the lid box so as to expose the hydrogen introducing port to the outside when filling the hydrogen tank with hydrogen gas. Thus, the operation of the lid is a preliminary operation for filling with hydrogen, and thus technology with improved safety utilizing the operation has also been proposed (see Japanese Unexamined Patent Application Publication No. 2001-351667).

Japanese Unexamined Patent Application Publication No. 2001-351667 discloses a technology in which even when a lid opener is operated by a driver for opening the lid during ON period of a start switch for starting operation of the fuel cells mounted in a vehicle, the operation is canceled and the lid won't open. With this technology, when a start switch is turned on, the lid is checked to see whether the lid is open or close. Only when the lid is closed, operation of the fuel cells is started, and when the lid is open, the operation of the fuel cells is prohibited. With the technology disclosed in Japanese Unexamined Patent Application Publication No. 2001-351667, a hydrogen supply operation and power generation of the fuel cells can be prevented from being performed at the same time.

SUMMARY OF THE INVENTION

According to one aspect of the present invention, a vehicle includes an energy storage, a connecting portion, a lid box, a lid state detector, a vehicle speed detector, and a stop drive device. The energy storage is to store energy. The vehicle is driven using the energy. An external energy supply device is connected to the connecting portion when energy is supplied to the energy storage from the energy supply device. The lid box is to protect the connecting portion. The lid box includes a lid. The lid state detector is configured to detect an open state of the lid of the lid box. The vehicle speed detector is configured to detect a speed of the vehicle. The stop drive device is configured to prevent the vehicle from being driven if the open state of the lid is detected and if the speed of the vehicle is lower than or equal to a threshold stopped vehicle speed.

According to one aspect of the present invention, in a method of controlling a vehicle, an open state of a lid of a lid box is detected. The lid box is provided to protect a connecting portion to which an external energy supply device is connected when energy is supplied to an energy storage from the energy supply device. A speed of the vehicle is detected. The vehicle is prevented from being driven if the open state of the lid is detected and if the speed of the vehicle is lower than or equal to a threshold stopped vehicle speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
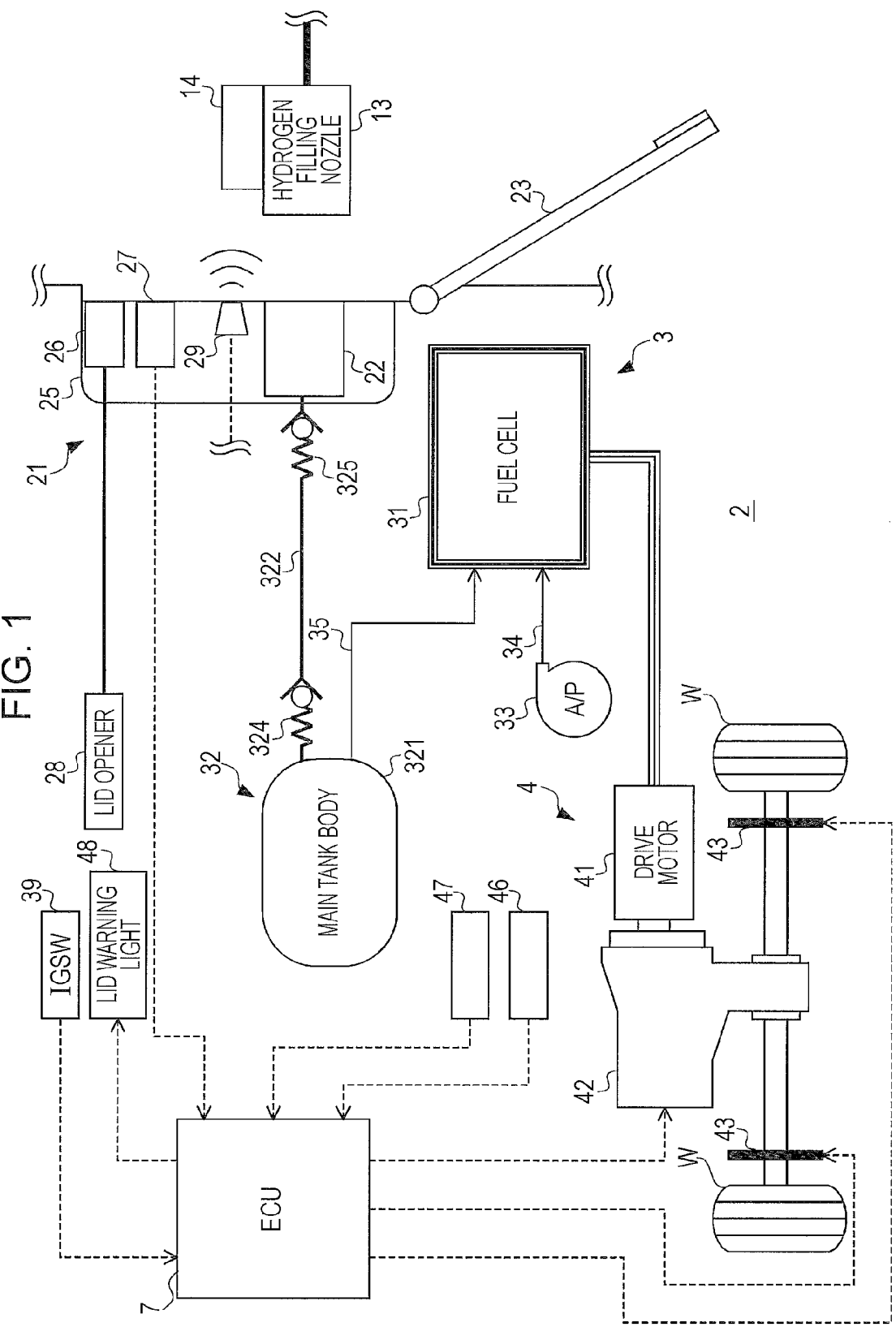
FIG. 1 is a diagram illustrating the configuration of a fuel cell vehicle according to an embodiment of the present disclosure.

The embodiments will now be described with reference to the accompanying drawings, wherein like reference numerals designate corresponding or identical elements throughout the various drawings.

FIG. 1 is a diagram illustrating the configuration of a vehicle 2 according to the present embodiment. The vehicles 2 includes a fuel cell system 3 which generates electric power using hydrogen stored in a high pressure tank 32, a drivetrain 4, and an electronic control unit (hereinafter referred to as an "ECU") 7 which controls the fuel cell system 3 and the drivetrain 4. The vehicle 2 is called a fuel cell vehicle which is driven using electric power generated by the fuel cell system 3.

The drivetrain 4 includes a drive motor 41 to which electric power generated by the fuel cell system 3 is supplied via an inverter which is not illustrated, a transmission 42 which transmits a driving force generated by the drive motor 41 to driving wheels W, W, and a brake 43 which decelerates the rotation of an output shaft of the transmission 42.

The fuel cell system 3 includes a fuel cell 31, a high pressure tank 32 as an energy storage which supplies hydrogen to the fuel cell 31, an air pump 33 which supplies air as an oxidant gas to the fuel cell 31, and an ignition switch 39 which detects an activation request to the fuel cell system 3.

The fuel cell 31 has a stacked structure in which, for example, several tens to several hundreds of cells are stacked. Each cell in the fuel cell 31 is formed by interposing a membrane electrode assembly (MEA) between a pair of separators. The membrane electrode assembly includes two electrodes which are an anode electrode (negative electrode) and a cathode electrode (positive electrode), and a solid polymer electrolyte membrane which is interposed between the electrodes. Normally, both electrodes each include a catalyst layer which is in contact with the solid polymer electrolyte membrane and acts as a catalyst in an oxidation-reduction reaction, and a gas diffusion layer which is in contact with the catalyst layer.

The air pump 33 is connected via an air supply conduit tube 34 to a cathode passage which is formed on the cathode electrode side of the fuel cell 31. The high pressure tank 32 is connected via a hydrogen supply conduit tube 35 to an anode passage which is formed on the anode electrode side of the fuel cell 31. When the fuel cell system 3 is activated upon operation of an ignition switch 39 by a driver, hydrogen is supplied to the anode passage of the fuel cell 31 from the high pressure tank 32, and air is supplied to the cathode passage from the air pump 33, thereby generating electric power. The electric power generated by the fuel cell 31 is supplied to the drive motor 41, thereby causing the vehicle 2 to move.

The high pressure tank 32 includes a main tank body 321 which stores highly compressed hydrogen, and a hydrogen introducing tube 322. One end of the hydrogen introducing tube 322 is connected to the main tank body 321, and the other end thereof is connected to a hydrogen introducing port 22 which is provided in the below-described lid box 21. The hydrogen introducing tube 322 is provided with check valves 324, 325 in the vicinity of the main tank body 321 and the hydrogen introducing port 22, respectively.

The lid box 21 is provided, for example, at a rear portion of a lateral side of the vehicle 2 to protect the hydrogen introducing port 22 and an infrared ray communication device 29 in the lid box 21. The lid box 21 includes a recessed housing 25, a lid 23 rotatably provided in the recessed housing 25, and a locking mechanism 26 which holds the lid 23.

The infrared ray communication device 29 includes an infrared LED, and a driver (not illustrated) for the infrared LED. The infrared ray communication device 29 generates a data signal indicating the current state of the high pressure tank 32 based on the pressure and the temperature detected by a pressure sensor and a temperature sensor (not illustrated) of the high pressure tank 32, and causes the infrared LED to blink according to the data signal, thereby transmitting the data signal to an infrared ray communication unit 14 of the below-described hydrogen station.

When the lid 23 is rotated to close the recessed housing 25, the locking mechanism 26 locks the lid 23 in the state where the lid 23 closes the recessed housing 25, and protects the hydrogen introducing port 22 in the lid box 21. The locking mechanism 26 is connected via a wire to a lid opener 28 which is provided near the driver's seat. When the lid opener 28 is operated by a driver, locking of the lid 23 by the locking mechanism 26 is released and the lid 23 is opened.

The steps of filling the high pressure tank 32 of the vehicle 2 with hydrogen at a hydrogen station are as follows. First, after parking the vehicle 2 near a dispenser (not illustrated) at the hydrogen station, a driver turns off the ignition switch 39 to stop power generation of the fuel cell 31. Subsequently, the driver operates the lid opener 28 to open the lid 23 so as to expose the hydrogen introducing port 22 to the outside. Subsequently, the driver connects a hydrogen filling nozzle 13 to the hydrogen introducing port 22, the hydrogen filling nozzle 13 being provided in the dispenser. Thus, hydrogen can be pumped through the hydrogen filling nozzle 13 via the hydrogen introducing port 22, and infrared communication can be performed between the infrared ray communication device 29 provided in the vehicle 2 and the infrared ray communication unit 14 provided in the hydrogen filling nozzle 13.

When infrared communication is made possible between the infrared ray communication device 29 and the infrared ray communication unit 14, a data signal indicating the current state of the high pressure tank 32 is transmitted from the vehicle 2. The dispenser recognizes the current state of the high pressure tank 32 based on the data signal received via the infrared ray communication unit 14, and fills the high pressure tank 32 with hydrogen by adjusting the amount of filling according to the state.

A vehicle speed sensor 46, a shift position sensor 47, and a lid sensor 27 are connected to the ECU 7 as sensors for detecting states of the vehicle 2.

The vehicle speed sensor 46 detects a speed of the vehicle 2, and transmits a signal, which is substantially proportional to the detected speed, to the ECU 7. The shift position sensor 47 detects a shift position (for example, a drive range position, a neutral range position, a reverse range position, or a parking range position) of the transmission 42 which has been selected by a shift lever operation (not illustrated) of the driver, and transmits a signal according to the current shift position to the ECU 7.

In a state where the lid 23 is locked by the locking mechanism 26 and the hydrogen introducing port 22 is protected in the lid box 21 (the lid is closed), the lid sensor 27 transmits a close signal indicating the state to the ECU 7, and in a state where locking of the lid 23 by the locking mechanism 26 is released and the hydrogen introducing port 22 is exposed to the outside (the lid is open), the lid sensor 27 transmits an open signal indicating the state to the ECU 7. It is to be noted that either one of the close signal and the open signal may be a no signal.

A lid warning light 48, which indicates a state of the lid 23, is provided at a position which can be visually recognized by the driver in the vehicle 2. The ECU 7, when receiving an open signal from the lid sensor 27, turns on the warning light 48 to inform the driver of an open state of the lid 23.

Next, a stop drive operation and a forced deceleration operation of the vehicle 2 based on an output of the lid sensor 27 will be described.

Figure 2:
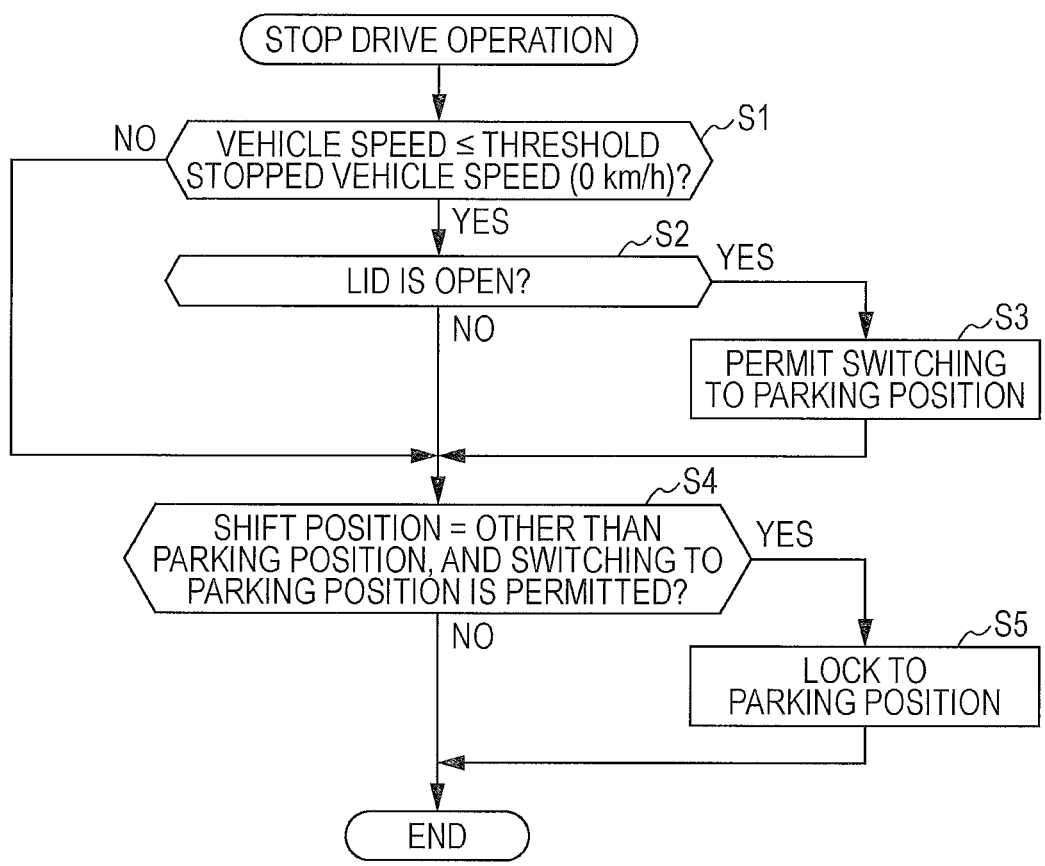
FIG. 2 is a flow chart illustrating the steps of a stop drive operation based on an output of a lid sensor according to the embodiment.

FIG. 2 is a flow chart illustrating the steps of the stop drive operation. The operation illustrated in FIG. 2 is performed by the ECU 7 with a predetermined cycle after the vehicle 2 is set in a state where the vehicle 2 can be driven using the electric power generated by the fuel cell or the electric power of a high voltage battery (not illustrated) upon on-operation of the ignition switch 39 by the driver.

In S1, the ECU 7 determines whether or not the vehicle speed is lower than or equal to a threshold stopped vehicle speed. The threshold stopped vehicle speed is a threshold value which is set with respect to the vehicle speed in order to determine whether or not the vehicle is substantially stopped. The threshold value is set to e.g. 0 [km/h]. When the determination in S1 is NO, the flow proceeds to S4, and when the determination in S1 is YES, the flow proceeds to S2. In S2, the ECU 7 determines whether or not an opening signal is received from the lid sensor 27. When the determination in S2 is NO, the flow proceeds to S4. When the determination in S2 is YES, i.e., when it is determined that the lid 23 is open and the vehicle is substantially stopped, the flow proceeds to S2. In S3, the ECU 7 permits an automatic change of the shift position of the transmission to the parking position, i.e., permits parking lock and the flow proceeds to S4. Whether or not an automatic change to the parking position is permitted is clearly indicated by e.g. a flag which is not illustrated.

In S4, the ECU 7 determines whether or not the current shift position is other than the parking position, and an automatic change to the parking position is permitted based on the output of the shift position sensor 47. When the determination in S4 is NO, the ECU 7 terminates the operation in order to maintain the shift position in the current state. When the determination in S4 is YES, the ECU 7 forcibly controls the shift position at the parking position so as to lock the drive system of the transmission 42 to the parking position, thereby preventing the vehicle 2 from being driven (S5). This prevents the vehicle 2 from being driven with the lid 23 open and thus prevents a foreign substance from being introduced into the lid box 21 so as to avoid damage of the hydrogen introducing port 22 and the infrared ray communication device 29 in the lid box 21.

Figure 3:
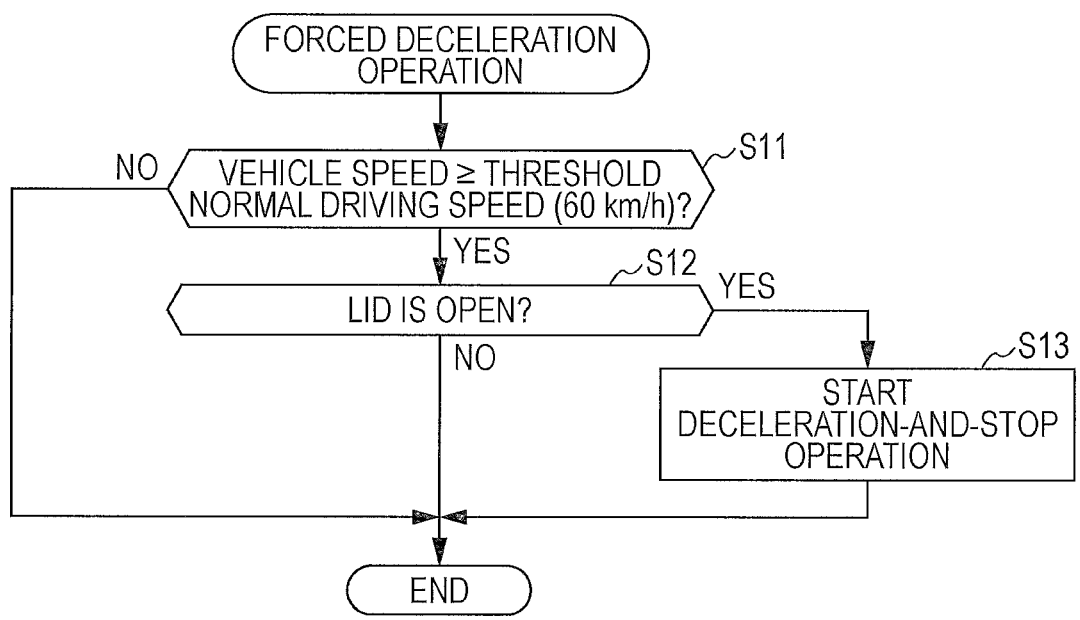
FIG. 3 is a flow chart illustrating the steps of a forced deceleration operation based on an output of the lid sensor according to the embodiment.

FIG. 3 is a flow chart illustrating the steps of a forced deceleration operation based on the output of the lid sensor. Similarly to the operation in FIG. 2, the operation illustrated in FIG. 3 is performed by the ECU 7 with a predetermined cycle after the vehicle 2 is set in a state where the vehicle 2 can be driven upon on-operation of the ignition switch 39 by the driver.

In S11, the ECU 7 determines whether or not the vehicle speed is higher than or equal to a threshold normal driving speed which is sufficiently higher than the above-mentioned threshold stopped vehicle speed. The threshold normal driving speed is a threshold value which is set with respect to the vehicle speed in order to instantly determine whether or not the driver has an intention of filling the high pressure tank 32 with hydrogen. The threshold value is set to e.g. 60 [km/h]. When the determination in S11 is NO, the operation is terminated, and when the determination in S11 is YES, the flow proceeds to S12. In S12, the ECU 7 determines whether or not an opening signal is received from the lid sensor 27. When the determination in S12 is NO, the operation is terminated.

When the determination in S12 is YES, i.e., in the case where the lid 23 is opened when the vehicle speed is higher than or equal to the threshold normal driving speed, the flow proceeds to S13, and a deceleration-and-stop operation is started. In the deceleration-and-stop operation, the ECU 7 controls the brake to forcibly decelerate the vehicle speed until the running vehicle 2 stops. This prevents the vehicle 2 from being driven for a long distance with the lid 23 open and thus prevents foreign substances from being introduced in a large amount into the lid box 21 so as to avoid damage of the hydrogen introducing port 22 and the infrared ray communication device 29 in the lid box 21.

With the fuel cell vehicle 2 in the present embodiment described in detail above, the following effects are obtained.

(1) According to the present embodiment, when an open state of the lid 23 is detected by the lid sensor 27, and the vehicle speed is lower than or equal to the threshold stopped vehicle speed (for example, 0 [km/h]), the drive system of the transmission 42 is locked to the parking position, thereby preventing the vehicle 2 from being driven. Thus, for example, when a driver tries to drive away with the lid 23 open after refilling hydrogen at a hydrogen station, the drive is disabled, thereby preventing the vehicle 2 from being driven with the lid 23 open and thus prevents a foreign substance from being introduced into the lid box 21 so as to avoid damage of the hydrogen introducing port 22 and the infrared ray communication device 29. In the present embodiment, drive of the vehicle 2 is disabled only when the vehicle speed is lower than or equal to the threshold stopped vehicle speed, and thus even when a driver opens the lid 23 while driving the vehicle 2 slowly so as to quickly start refilling hydrogen in a hydrogen station, the vehicle 2 is not prevented from being driven, and thus the usability of the driver can be improved. In the present embodiment, the lid 23 does not need to be electromagnetically controlled for opening or closing, and thus an accompanying electronic device such as an actuator or a controller does not need to be mounted, and consequently cost and weight can be reduced. In the present embodiment, even when the lid 23 is opened unintentionally during a drive, the vehicle 2 is not prevented from being driven unless the vehicle speed is lower than or equal to the threshold stopped vehicle speed, in other words, the vehicle 2 is prevented from being driven only when the vehicle speed is lower than or equal to the threshold stopped vehicle speed, and thus sense of incongruity felt by a driver is reduced.

(2) According to the present embodiment, the lid warning light 48 is turned on to inform a driver of an open state of the lid 23, thus even the vehicle 2 is prevented from being automatically driven due to opening of the lid 23 against the intention of the driver, the driver can immediately recognize that the drive prevention is caused by the lid 23, and thus sense of uneasiness felt by the driver can be reduced.

(3) According to the present embodiment, in the case where the lid 23 is opened when the vehicle speed is higher than or equal to the threshold normal driving speed (e.g. 60 [km/h]), the vehicle speed is forcibly decelerated. When the vehicle speed is lower than or equal to the threshold stopped vehicle speed, the transmission 42 is locked to the parking position, thereby preventing the vehicle 2 from being driven. Consequently, even when the lid 23 is opened by an operation error, the vehicle 2 can be prevented from being driven for a long distance with the lid 23 open, and thus foreign substances can be prevented from being introduced in a large amount into the lid box 21.

(4) According to the present embodiment, the drive system of the transmission 42 is locked to the parking position, thereby preventing the vehicle 2 from being driven, and thus the vehicle 2 is reliably prevented from being driven.

(5) In the present embodiment, a threshold stopped vehicle speed is set to 0 [km/h], the threshold value for the ECU 7 to determine whether or not the vehicle 2 is prevented from being driven. Thus, when the vehicle 2 is definitely stopped or the vehicle 2 has been definitely stopped, i.e., only when a driver has a definite intention of stopping the vehicle 2, the vehicle 2 is prevented from being driven, and thus sense of incongruity felt by the driver is reliably reduced.

In the above, an embodiment of the present disclosure has been described; however, the present disclosure is not limited to the embodiment. In the above embodiment, an example has been described in which the high pressure tank for storing a fuel gas serves as an energy storage, however, without being limited to this, a storage container provided with a storage alloy may serve as an energy storage. In the above embodiment, an example of a fuel cell vehicle has been described which uses hydrogen as energy for driving the vehicle, however, without being limited to this, the present disclosure may be applied to a natural gas vehicle which uses natural gas as energy for driving the vehicle.

In the above embodiment, the shift position is forcibly controlled at the parking position in S5 so as to prevent the vehicle 2 from being driven, however, the manner in which the vehicle 2 is prevented from being driven is not limited to this. For example, the vehicle 2 may be prevented from being driven by applying a parking brake in S5.

In the above-described embodiment, locking of the lid 23 by the locking mechanism 26 is mechanically released via a wire by an operation of the lid opener 28, however, the present disclosure is not limited to this, and locking of the lid 23 may be electromagnetically released via an actuator. In the above embodiment, an example has been described in which the lid warning light 48 serves as an informing unit, however, the informing unit is not limited to the lid warning light 48. Other aspect of the informing unit may include a unit using sound or vibration in addition to a unit visually appealing to a driver like the lid warning light as in the above embodiment.

The present disclosure is not limited to be applied to the fuel cell vehicle 2, and may be applied to an electric vehicle. The electric vehicle includes a power storage device as an energy storage, a charge connector to which the plug of an external charging device is connected when power is supplied to the power storage device from the charging device, and a lid box which internally protects the charge connector. That is to say, when the high pressure tank 32 in the fuel cell vehicle 2 of the above-described embodiment corresponds to the power storage device and the hydrogen introducing port 22 corresponds to the charge connector, and thus the present disclosure may be easily applied to an electric vehicle.

(1) The embodiment of the present disclosure provides a vehicle including an energy storage which stores energy (for example, the below-mentioned hydrogen), a connecting portion (for example, the below-described hydrogen introducing port 22) to which an external energy supply device (for example, the below-described dispenser at a hydrogen station) is connected when energy is supplied to the energy storage (for example, the below-described high pressure tank 32) from the energy supply device (for example, the below-described hydrogen filling nozzle 13 of the dispenser), and a lid box (for example, the below-described lid box 21) which internally protects the connecting portion. The vehicle (for example, the below-described fuel cell vehicle 2) is driven using the energy stored in the energy storage. The vehicle includes a lid state detecting unit (for example, the below-described lid sensor 27) configured to detect an open state of a lid of the lid box, a vehicle speed detecting unit (for example, the below-described vehicle speed sensor 46) configured to detect a speed of the vehicle, and a stop drive unit (for example, the below-described transmission 42 and ECU 7) configured to prevent the vehicle from being driven when the open state of the lid is detected and the speed of the vehicle is lower than or equal to a threshold stopped vehicle speed.

(2) In the embodiment, the connecting portion to which an external energy supply device is connected is protected in the lid box. When an open state of the lid is detected and the vehicle speed is lower than or equal to the threshold stopped vehicle speed, driving of the vehicle is prevented by the stop drive unit. Thus, for example, when a driver tries to drive away with the lid open after refilling hydrogen at a hydrogen station, the drive is disabled, thereby preventing the vehicle from being driven with the lid open and thus prevents a foreign substance from being introduced into the lid box 21 so as to avoid damage of the connecting portion. In the present disclosure, only when the vehicle speed is lower than or equal to the threshold stopped vehicle speed, the vehicle is prevented from being driven. Thus, even when a driver opens the lid while driving the vehicle slowly so as to quickly start refilling hydrogen in a hydrogen station, the vehicle is not prevented from being driven, and thus the usability of the driver can be improved. In the present disclosure, the lid does not need to be electromagnetically controlled for opening or closing, and thus an accompanying electronic device such as an actuator or a controller does not need to be mounted, and consequently cost and weight can be reduced. In the present disclosure, even when the lid is opened unintentionally during a drive, the vehicle is not prevented from being driven unless the vehicle speed is lower than or equal to the threshold stopped vehicle speed, in other words, the vehicle is prevented from being driven only when the vehicle speed is lower than or equal to the threshold stopped vehicle speed, and thus sense of incongruity felt by a driver is reduced.

(3) In the embodiment, the vehicle preferably further includes an informing unit (for example, the below-described lid warning light 48 and ECU 7) configured to inform a driver of an open state of the lid when the open state of the lid is detected by the lid state detecting unit.

(4) According to the embodiment, an informing unit informs a driver of an open state of the lid, thus even the vehicle is prevented from being automatically driven due to opening of the lid against the intention of the driver, the driver can immediately recognize that the drive prevention is caused by the lid, and thus sense of uneasiness felt by the driver can be reduced.

(5) In the embodiment, the vehicle preferably further includes a deceleration unit (for example, the below-described brake 43 and ECU 7) configured to forcibly decelerate the speed of the vehicle during a drive when the speed of the vehicle is higher than or equal to a threshold normal driving speed which is sufficiently higher than the threshold stopped vehicle speed, and the open state of the lid is detected by the lid state detecting unit.

(6) According to the embodiment, in the case where the lid is opened when the vehicle speed is higher than or equal to the threshold normal driving speed, the vehicle speed is forcibly decelerated. When the vehicle speed is lower than or equal to the threshold stopped vehicle speed, the vehicle 2 is prohibited from being driven. Consequently, even when the lid is opened by an operation error, the vehicle can be prevented from being driven for a long distance with the lid open, and thus foreign substances can be prevented from being introduced in a large amount into the lid box.

(7) In the embodiment, the stop drive unit preferably prevents the vehicle from being driven by locking a drive system of a transmission (for example, the below-described transmission 42).

(8) According to the embodiment, the drive system of the transmission is locked, thereby reliably preventing the vehicle from being driven.

(9) In the embodiment, the threshold stopped vehicle speed is preferably zero.

(10) According to the embodiment, a threshold stopped vehicle speed is set to 0, the threshold value for the stop drive unit to determine whether or not the vehicle is prevented from being driven. Thus, when the vehicle is definitely stopped or the vehicle has been definitely stopped, i.e., only when a driver has a definite intention of stopping the vehicle, the vehicle is prevented from being driven, and thus sense of incongruity felt by the driver is reliably reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle comprising:
an energy storage to store energy, the vehicle being driven using the energy;
a connecting portion to which an external energy supply device is connected when energy is supplied to the energy storage from the energy supply device; and
a lid box to protect the connecting portion, the lid box including a lid;
a lid state detector configured to detect an open state of the lid of the lid box;
a locking mechanism to lock the lid in a state where the lid box is closed by the lid;
a lid opener provided in the vehicle to release locking of the lid by the locking mechanism, the lid opener being provided to release the locking of the lid even during driving when the lid opener is operated by a driver;

a vehicle speed detector configured to detect a speed of the vehicle; and a stop drive device configured to prevent the vehicle from being driven if the open state of the lid is detected and if the speed of the vehicle is lower than or equal to a threshold stopped vehicle speed.

2. The vehicle according to claim 1, further comprising:
an informing device configured to inform a driver of an open state of the lid if the open state of the lid is detected by the lid state detector.

3. The vehicle according to claim 1, further comprising:
a deceleration device configured to forcibly decelerate the speed of the vehicle during a drive of the vehicle if the speed of the vehicle is higher than or equal to a threshold normal driving speed which is higher than the threshold stopped vehicle speed and if the open state of the lid is detected by the lid state detector.

4. The vehicle according to claim 1,
wherein the stop drive device is configured to prevent the vehicle from being driven by locking a drive system of a transmission.

5. The vehicle according to claim 1,
wherein the threshold stopped vehicle speed is 0.

6. The vehicle according to claim 1,
wherein the lid box further includes
a recessed housing in which the connecting portion is provided, the lid being provided to be rotatable with respect to the recessed housing, and
a locking mechanism to hold the lid in a state where the lid is closed.

7. The vehicle according to claim 6,
wherein the lid box protects the connecting portion inside the lid box in a state where the lid is closed.

8. A vehicle comprising:
an energy storage to store energy, the vehicle being driven using the energy;
a connecting portion to which an external energy supply device is connected when energy is supplied to the energy storage from the energy supply device; and
a lid box to protect the connecting portion, the lid box including a lid;

lid state detecting means for detecting an open state of the lid of the lid box;

a locking mechanism to lock the lid in a state where the lid box is closed by the lid;

a lid opener provided in the vehicle to release locking of the lid by the locking mechanism, the lid opener being provided to release the locking of the lid even during driving when the lid opener is operated by a driver;

vehicle speed detecting means for detecting a speed of the vehicle; and stop drive means for preventing the vehicle from being driven if the open state of the lid is detected and if the speed of the vehicle is lower than or equal to a threshold stopped vehicle speed.

9. The vehicle according to claim 8, further comprising:
a deceleration device configured to forcibly decelerate the speed of the vehicle during a drive of the vehicle if the speed of the vehicle is higher than or equal to a threshold normal driving speed which is higher than the threshold stopped vehicle speed and if the open state of the lid is detected by the lid state detector.

10. A method of controlling a vehicle, comprising:
detecting an open state of a lid of a lid box, the lid box being provided to protect a connecting portion to which an external energy supply device is connected when energy is supplied to an energy storage from the energy supply device;

locking the lid in a state where the lid box is closed by the lid;

providing a lid opener in the vehicle to release the locking of the lid by a lid opener even during driving when the lid opener is operated by a driver;

detecting a speed of the vehicle; and preventing the vehicle from being driven if the open state of the lid is detected and if the speed of the vehicle is lower than or equal to a threshold stopped vehicle speed.

11. The method according to claim 10, further comprising:
forcibly decelerating the speed of the vehicle during a drive of the vehicle if the speed of the vehicle is higher than or equal to a threshold normal driving speed which is higher than the threshold stopped vehicle speed and if the open state of the lid is detected by the lid state detector.

\* \* \* \* \*